(12) United States Patent
Li

(10) Patent No.: US 11,906,767 B2
(45) Date of Patent: Feb. 20, 2024

(54) LIGHT CONTROL SYSTEM WITH HEXAGONAL-SHAPED TUNABLE OPTICS

(71) Applicant: HONEYWELL INTERNATIONAL INC., Charlotte, NC (US)

(72) Inventor: Wei Li, Urbana, OH (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 203 days.

(21) Appl. No.: 17/448,214

(22) Filed: Sep. 21, 2021

(65) Prior Publication Data

US 2023/0085757 A1   Mar. 23, 2023

(51) Int. Cl.
| | | |
|---|---|---|
| G02B 5/30 | (2006.01) |
| F21V 7/00 | (2006.01) |
| B60Q 1/24 | (2006.01) |
| G02B 3/14 | (2006.01) |
| G02B 26/00 | (2006.01) |
| F21S 41/64 | (2018.01) |
| F21Y 115/30 | (2016.01) |
| F21Y 115/10 | (2016.01) |

(52) U.S. Cl.
CPC .......... *G02B 5/3008* (2013.01); *B60Q 1/245* (2013.01); *F21S 41/645* (2018.01); *F21V 7/0091* (2013.01); *G02B 3/14* (2013.01); *G02B 26/005* (2013.01); *F21Y 2115/10* (2016.08); *F21Y 2115/30* (2016.08)

(58) Field of Classification Search
CPC ...... G02B 5/3008; G02B 3/14; G02B 26/005; F21S 41/645; B60Q 1/245; F21V 7/0091; F21V 5/04; F21V 5/007; F21V 5/008; F21V 14/06; F21Y 2115/30; F21Y 2115/10

See application file for complete search history.

(56) References Cited

U.S. PATENT DOCUMENTS

| | | | | |
|---|---|---|---|---|
| 5,774,273 A | * | 6/1998 | Bornhorst | ................ G02B 3/14 |
| | | | | 359/666 |
| 7,697,187 B2 | | 4/2010 | Kato et al. | |
| 7,701,642 B2 | * | 4/2010 | Obinata | ............... G02B 3/0056 |
| | | | | 359/665 |
| 7,715,106 B2 | | 5/2010 | Li et al. | |

(Continued)

FOREIGN PATENT DOCUMENTS

| | | |
|---|---|---|
| JP | 4834682 B2 | 12/2011 |
| WO | 2008097440 A2 | 8/2008 |

*Primary Examiner* — Bao Q Truong
(74) *Attorney, Agent, or Firm* — Lorenz & Kopf LLP

(57) ABSTRACT

A tunable optic includes a hexagonal-shaped housing, a polar liquid, a first electrode, a second electrode, a third electrode, a fourth electrode, a fifth electrode, a sixth electrode, and a grounding electrode. The hexagonal-shaped housing includes first, second, third, fourth, fifth, and sixth side walls and first and second light transmissive end walls, and the first, second, third, fourth, fifth and sixth side walls and the first and second light transmissive end walls define a hexagonal-shaped inner cavity. The polar liquid is disposed within the hexagonal-shaped inner cavity. The polar liquid has a surface, and the surface has a curvature and a two-dimensional tilt angle that is variable in response to voltages supplied to each of the first, second, third, fourth, fifth, and sixth electrodes, whereby lens characteristics and light deflection characteristics of the tunable optic are varied.

20 Claims, 8 Drawing Sheets

(56) References Cited

U.S. PATENT DOCUMENTS

| | | | |
|---|---|---|---|
| 7,817,343 B2 | 10/2010 | Choi et al. | |
| 8,514,474 B2 | 8/2013 | Chou et al. | |
| 10,268,036 B1 | 4/2019 | Schultz et al. | |
| 2013/0063953 A1* | 3/2013 | Lee | F21V 5/04 |
| | | | 362/311.02 |
| 2016/0169469 A1* | 6/2016 | Sugiyama | F21V 9/14 |
| | | | 362/19 |
| 2017/0305327 A1* | 10/2017 | Hoffmann | F21S 41/63 |

* cited by examiner

LIGHT CONTROL SYSTEM WITH HEXAGONAL-SHAPED TUNABLE OPTICS

TECHNICAL FIELD

The present invention generally relates to light control systems, and more particularly relates to a light control system that includes one or more hexagonal-shaped tunable optics.

BACKGROUND

Many search-and-rescue aircraft, such as helicopters, rely on search-and-landing lights that have dual beam patterns to implement both search and landing operations. Typically, a relatively small beam pattern (e.g., 1-5-degree beam size) is used during search operations, while a relatively larger beam patter (e.g., 10-15-degree beam size) is used during landing operations. During search operations, the light beam is moved continuously along the surface to find and/or track various entities. During landing operations, the light beam illuminates the surface on which the aircraft is landing.

Currently, most search-and-landing lights implement a beam steering function via mechanical means. For example, many rely on motor driven actuation to steer the light beam in one or two dimensions. Although generally reliable and robust, the mechanical implementations can be relatively heavy, costly, and occupy a large space volume. While various non-mechanical beam steering devices have been developed (e.g., optical phased array devices), currently there are no known electrowetting devices that simultaneously implement variable beam pattern and two-dimensional beam steering.

Hence, there is a need for a light control system that implements non-mechanical, liquid based, simultaneous variable beam pattern and two-dimensional beam steering. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a tunable optic includes a hexagonal-shaped housing, a polar liquid, a first electrode, a second electrode, a third electrode, a fourth electrode, a fifth electrode, a sixth electrode, and a grounding electrode. The hexagonal-shaped housing includes first, second, third, fourth, fifth, and sixth side walls and first and second light transmissive end walls. The first and fourth side walls are disposed parallel to each other, the second and fifth sidewalls are disposed parallel to each other, and the third and sixth sidewalls are disposed parallel to each other. The first and second light transmissive end walls are spaced apart from each other and are coupled to the first, second, third, fourth, fifth and sixth side walls, whereby the first, second, third, fourth, fifth and sixth side walls and the first and second light transmissive end walls define a hexagonal-shaped inner cavity. The polar liquid is disposed within the hexagonal-shaped inner cavity. The first electrode is coupled to the first side wall, the second electrode is coupled to the second side wall, the third electrode is coupled to the third side wall, the fourth electrode is coupled to the fourth side wall, the fifth electrode is coupled to the fifth side wall, the sixth electrode is coupled to the sixth sidewall, and the grounding electrode is electrically connected to the polar liquid. The polar liquid has a surface, and the surface has a curvature and a two-dimensional tilt angle that is variable in response to voltages supplied to each of the first, second, third, fourth, fifth, and sixth electrodes, whereby lens characteristics and light deflection characteristics of the tunable optic are varied.

In another embodiment, a light control system includes a housing, a controllable power source configured to supply a plurality of voltages, a light source coupled to the housing and operable, upon being electrically energized, to emit a light beam, and at least seven hexagonal-shaped tunable optics that are coupled to the housing and arranged such that one of the hexagonal-shaped tunable optics is surrounded by six other hexagonal-shaped tunable optics and such that there are no gaps between adjacent hexagonal-shaped tunable optics. Each hexagonal-shaped tunable optic is disposed to receive at least a portion of the light beam emitted from the light source. Each hexagonal-shaped tunable optic has tunable lens characteristics and tunable light deflection characteristics. Each hexagonal-shaped tunable optic is further coupled to receive six voltages from the controllable power source. Each hexagonal-shaped tunable optic includes a liquid that varies the tunable lens characteristics and tunable light deflection characteristics in response to the six voltages supplied thereto, whereby light beam pattern and light beam steering are achieved.

Furthermore, other desirable features and characteristics of the light control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
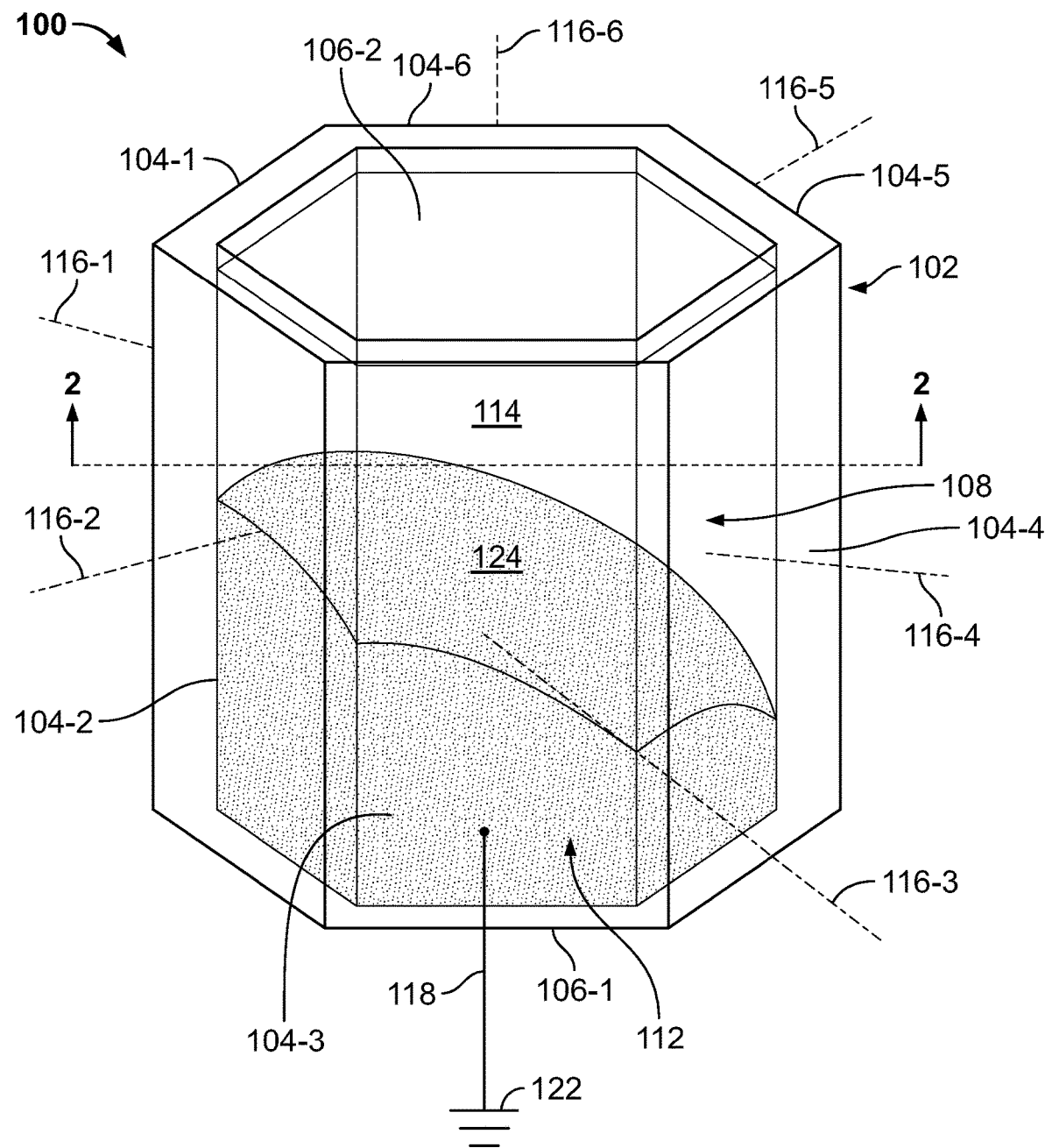
FIG. 1 a perspective view, in simplified, ghosted form, of one embodiment of a hexagonal-shaped tunable optic.
Figure 2:
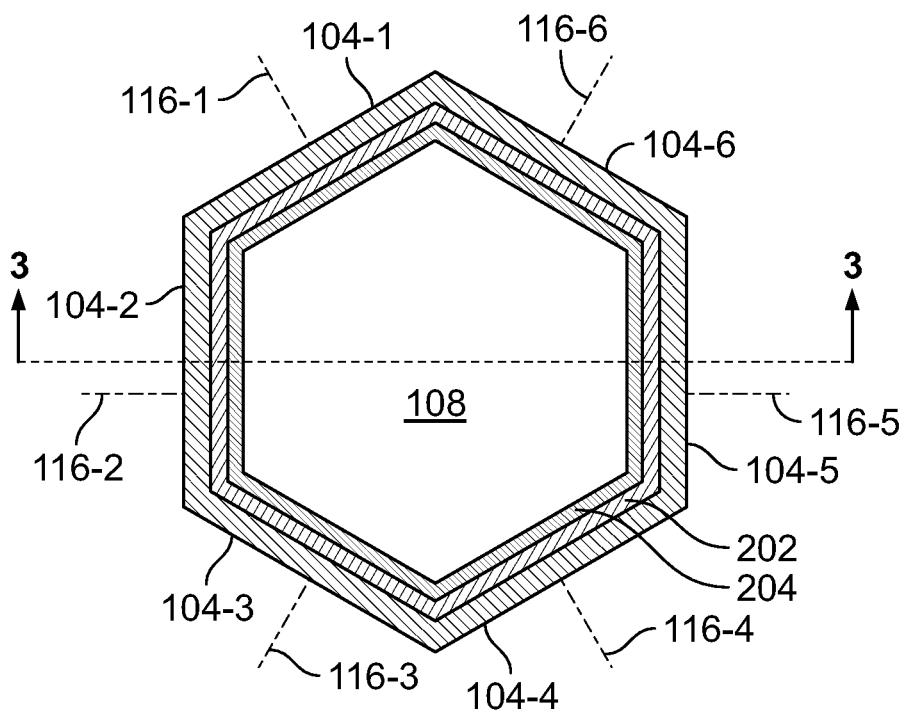
FIG. 2 is a cross section view of the hexagonal-shaped tunable optic taken along line 2-2 in FIG. 1.
Figure 3:
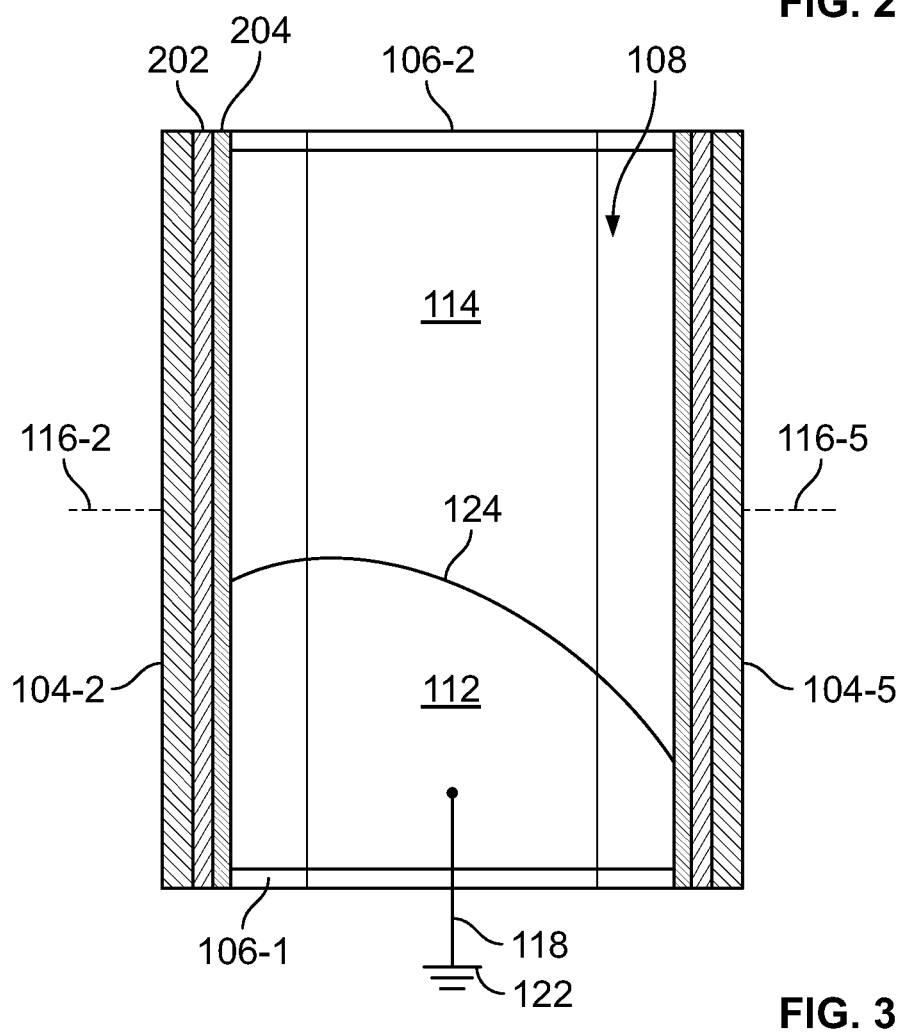
FIG. 3 is a cross section view of the hexagonal-shaped tunable optic taken along line 3-3 in FIG. 2.

One embodiment of tunable optic 100 is depicted in FIGS. 1-3, and with reference first to FIG. 1 will be described. The tunable optic 100 includes a hexagonal-shaped housing 102 that has six sidewalls 104—a first side wall 104-1, a second side wall 104-2, a third side wall 104-3, a fourth side wall 104-4, a fifth side wall 104-5, and a sixth side wall 104-6—and two end walls 106—a first end wall 106-1 and a second end wall 106-2. The first and fourth side walls 104-1, 104-4 are disposed parallel to each other, the second and fifth side walls 104-2, 104-5 are disposed parallel to each other, and the third and sixth side walls 104-3, 104-6 are disposed parallel to each other. Because, as noted, the housing 102 is hexagonal-shaped, the first side wall 104-1 is coupled to, and is disposed at 120-degrees relative to, the second and sixth side walls 104-2, 104-6, the third side wall 104-3 is coupled to, and is disposed at 120-degrees relative to, the second and fourth side walls 104-2, 104-4, and the fifth side wall 104-5 is coupled to, and is disposed at 120-degrees relative to, the fourth and sixth side walls 104-4, 104-6.

The first and second end walls 106-1, 106-2 are spaced apart from each other. The first and second end walls 106-1, 106-2, which are also preferably hexagonally shaped, are coupled to the first, second, third, fourth, fifth and sixth side walls 104-1, 104-2, 104-3, 104-4, 104-5, 104-6. As such, the six side walls 104 and the two end walls 106 define a hexagonal-shaped inner cavity 108. As shown more clearly in FIG. 3, the first and second end walls 106-1, 106-2 are each composed of a light transmissive material, such as glass. The six side walls 104 may be formed of light transmissive material or an opaque material. In either case, and as FIGS. 2 and 3 depict, a dielectric layer 202, such as $SiO_2$, SiN, $Al_2O_3$ or Parylene is preferably coated on the inner facing surfaces of the six side walls 104, and a hydrophobic layer 204, such as fluoropolymer (Teflon AF or Cytop) preferably overlies the dielectric layer 202.

A liquid 112, which is preferably a polar liquid, is disposed within the hexagonal-shaped inner cavity 108 and contacts the hydrophobic layer 204. The polar liquid 112 may vary. In one embodiment, the polar liquid 112 is a saline solution (e.g., salt and water). In other embodiments, the polar liquid 112 may be water, a water-salt-glycerin solution, or a water-ethanol solution, just to name a few. Though not required, in some embodiments a non-polar liquid 114 may also be disposed within the hexagonal-shaped inner cavity 108. When included, the non-polar liquid 114 contacts the polar liquid 112 and the hydrophobic layer 204. The non-polar liquid 114 may also vary. In one embodiment, the non-polar liquid 114 is an oil. In other embodiments, the non-polar liquid 114 may be silicon oil or dodecane, just to name a few. As may be appreciated, the polar liquid 112 and the non-polar liquid 114 are immiscible.

As FIGS. 1-3 also depict, six electrodes 116 are coupled to the hexagonal-shaped housing 102. In particular, a first electrode 116-1 is coupled to the first side wall 104-1, a second electrode 116-2 is coupled to the second side wall 104-2, a third electrode 116-3 is coupled to the third side wall 104-3, a fourth electrode 116-4 is coupled to the fourth side wall 104-4, a fifth electrode 116-5 is coupled to the fifth side wall 104-5, and a sixth electrode 116-6 is coupled to the sixth side wall 104-6. Preferably, and as will be described in more detail further below, the first electrode 116-1 is coupled to receive a first voltage, the second electrode 116-2 is coupled to receive a second voltage, the third electrode 116-3 is coupled to receive a third voltage, the fourth electrode 116-4 is coupled to receive a fourth voltage, the fifth electrode 116-5 is coupled to receive a fifth voltage, and the sixth electrode 116-6 is coupled to receive a sixth voltage. Moreover, a grounding electrode 118 is electrically connected to the polar liquid 112 and to a circuit common 122.

As shown most clearly in FIGS. 1 and 3, the polar liquid 112 has a surface 124. Because the tunable optic 100 is an electrowetting type of optic, the curvature and tilt angle of the surface 124 are variable in response to the variable voltages supplied to each of the first, second, third, fourth, fifth, and sixth electrodes 116. As may be appreciated, varying the curvature of the surface 124 varies the lens characteristics of the tunable optic 100, and varying the tilt angle of the surface 124 varies the light deflection characteristics of the tunable optic 100. More specifically, when voltages of equal value are applied to one pair of parallel side walls (e.g., 104-1, 104-4), and the voltages are varied, the lens characteristics of the tunable optic 100 are varied. When voltages of unequal value are applied to the other two pair of parallel side walls (e.g., 104-2, 104-5 and 104-3, 104-6), and these voltages are varied, the tilt angle of the surface 124 is varied in two dimensions (e.g., yaw angle and pitch angle).

It should be noted that because the side walls 104 are not disposed orthogonally, the tilt angles in the two dimensions, for given voltage values, will also not be orthogonal. Thus, when the two pair of parallel side walls are 104-2, 104-5 and 104-3, 104-6, the yaw and pitch angles of the surface 124 may be calculated according to the following equations, in which it is assumed that f is the deflection angle as a function of the two voltages applied to the two parallel side walls:

$$\text{Yaw Angle} = f(V_2, V_5) + f(V_3, V_6)\cos(60°)$$

$$\text{Pitch Angle} = f(V_3, V_6)\sin(60°)$$

where: $V_2$ is the voltage applied to the second side wall 104-2,
$V_5$ is the voltage applied to the fifth side wall 104-5,
$V_3$ is the voltage applied to the third side wall 104-3, and
$V_6$ is the voltage applied to the sixth side wall 104-6.

Before proceeding further, it is noted that tunable optic 100 may be configured such that the lens characteristics are that of a spherical lens or that of a cylindrical lens. As is generally known to persons of skill in the art, the lens characteristics may be determined based on the dielectric layer 202, the hydrophobic layer 204, the polar liquid 112, and the dimensions of the side walls 104.

Figure 4:
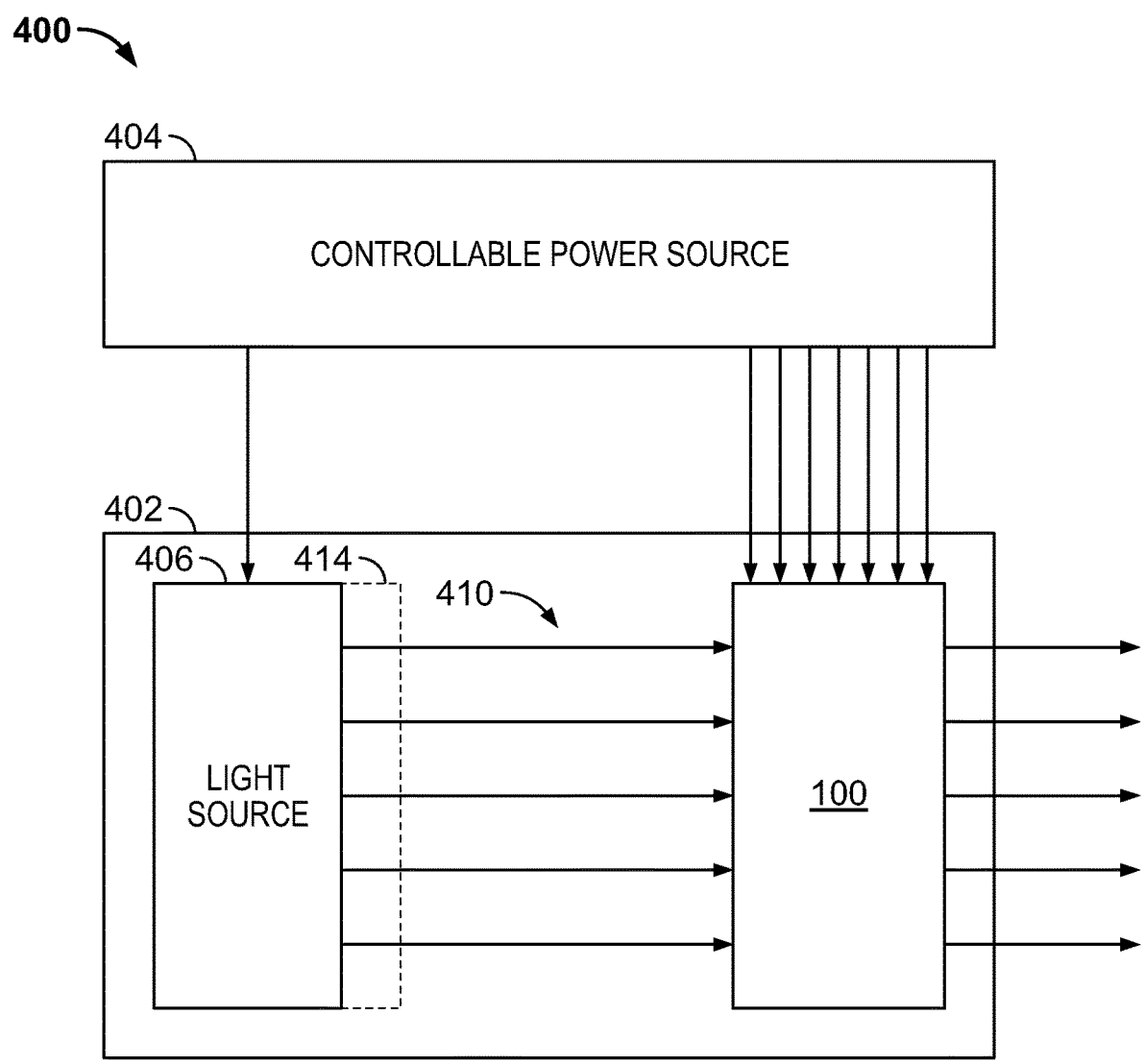
FIG. 4 is a functional block diagram of one example embodiment of a light control system that includes the hexagonal-shaped tunable optic depicted in FIGS. 1-3.

One or more of the tunable optics 100 may be implemented as part of a light control system. A functional block diagram of one embodiment of a light control system 400 is depicted in FIG. 4 and includes a housing 402, a controllable power source 404, a light source 406, and one of the tunable optics 100. The housing 402 may be variously adapted and configured, depending upon the end-use of the light control system 400. For example, the housing 402 may be adapted and configured to be mounted in or on various types of terrestrial vehicles, various types of aircraft, various types of spacecraft, and various types of seagoing craft (both submersible and non-submersible). The housing 402 may also be adapted for various other end-use environments, as needed or desired.

The controllable power source 404 is configured to supply at least six voltages—a first voltage, a second voltage, a third voltage, a fourth voltage, a fifth voltage, and a sixth voltage—to the tunable optic 100. In particular, the first voltage is supplied to the first electrode, the second voltage is supplied to the second electrode, the third voltage is supplied to the third electrode, the fourth voltage is supplied to the fourth electrode, the fifth voltage is supplied to the fifth electrode, and the sixth voltage is supplied to the sixth electrode. As FIG. 4 also depicts, the controllable power source 404 may additionally be configured to supply a voltage to the light source 406, thereby electrically energizing the light source 406. The voltage supplied to the light source 406 may be fixed or it may also be variable. In other embodiments, the light source 406 may be electrically energized from a power source that is separate and distinct from the controllable power source 404.

Regardless of its electrical energization source, the light source 406 is coupled to the housing 402 and is operable, upon being electrically energized, to emit a light beam 410 (for simplicity, depicted using a plurality of individual rays). The light source 406 may be variously configured and implemented. For example, it may be implemented using one or more light emitting diodes (LEDs), one or more lasers, one or more gas discharge lamps, or one or more incandescent lamps, just to name a few. In some embodiments, the light source 406 may be configured to emit white light or it may be configured to emit color light. In some embodiments, the light source 406 may be an individual light source or may be implemented using an array of light sources.

Figure 5:
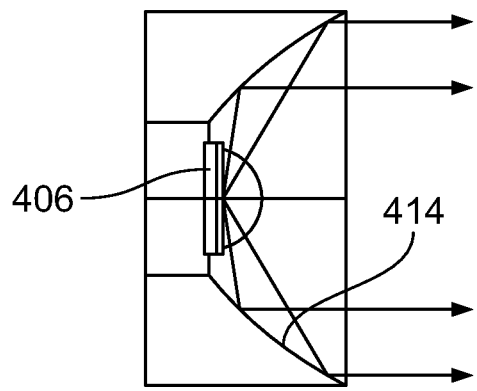
FIGS. 5-7 depict three different example embodiments of non-variable optics that may be used in the system of FIG. 4.
Figure 6:
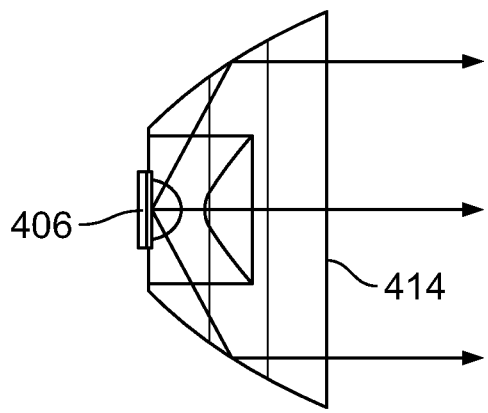
Figure 7:
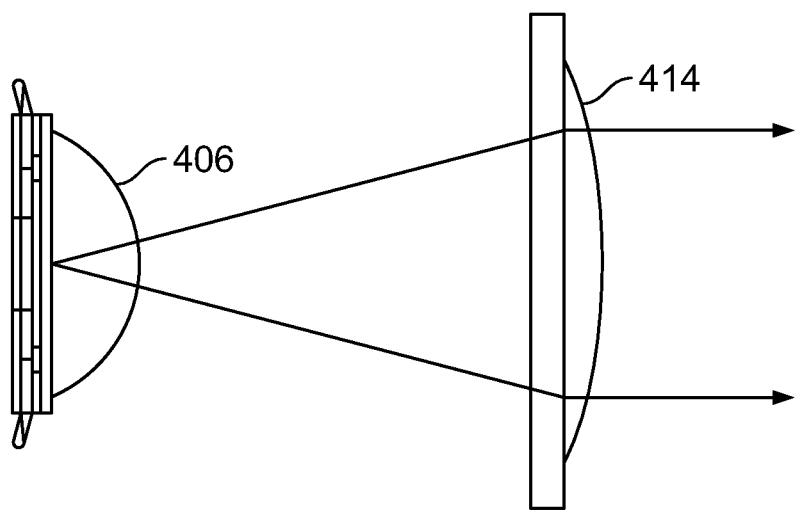

In some embodiments the light control system 400 may additionally include one or more optic elements 414, which are depicted in phantom in FIG. 4. The one or more optic elements 414, when included, are preferably non-variable optics 414 and are coupled to the housing 102 and are disposed between the light source 406 and the hexagonal-shaped tunable optic 100. The specific type of non-variable optic 414 that is used may vary and may depend, for example, on the specific light source 406 used. The non-variable optics 414 may be configured as a reflector, such as the one depicted in FIG. 5, a total-internal-reflection (TIR) lens, such as the one depicted in FIG. 6, or an optic lens such as the one depicted in FIG. 7

The tunable optic 100 is preferably configured such that its lens characteristics are that of a spherical lens. As noted above, when voltages of equal value are applied to one pair of parallel side walls 104, and the voltages are varied, the lens characteristics of the tunable optic 100 are varied. In this case, the lens characteristics of the tunable optic 100 may be varied such that it may selectively function, for example, as either a search light or a landing light. In particular, when voltages of a first value are applied to one pair of the side walls 104, the tunable optic 100 will narrow the light beam 410 emitted from the light source 406 and, if included, transmitted through the non-variable optic 114. As is generally known, a relatively narrower beam pattern is preferable for search light applications. Conversely, when voltages of a second value (lower than the first value) are applied to one pair of the side walls 104, the tunable optic 100 will widen the light beam 410 emitted from the light source 406 and, if included, transmitted through the non-variable optic 114. As is generally known, a relatively wide beam pattern is preferable for landing light applications. In both instances, the voltages applied to the other two pair of parallel side walls may be varied, as needed, to vary the yaw and pitch angles of the light beam.

Figure 8:
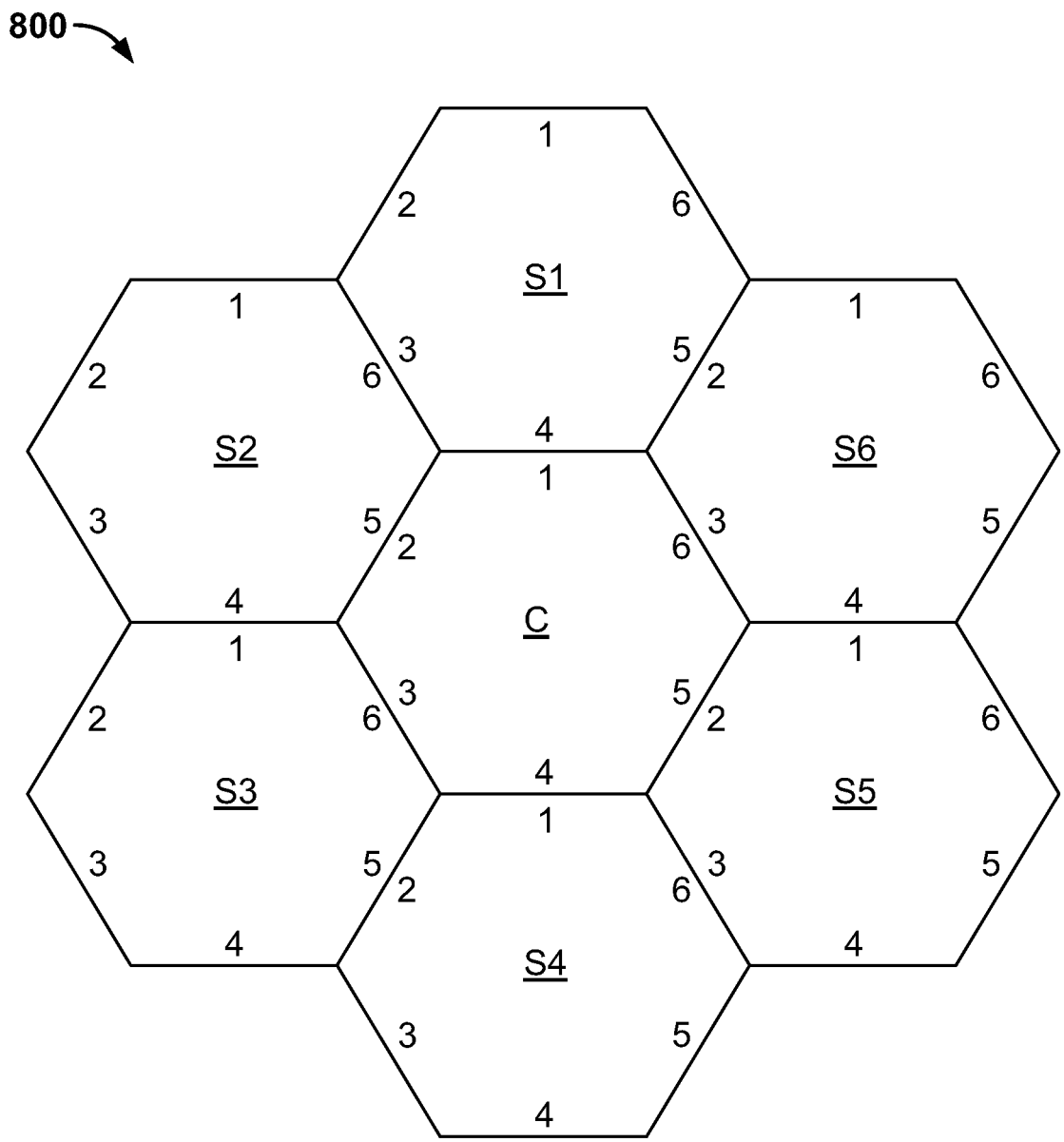
FIG. 8 is a front view of a tightly arrayed tunable optic that includes seven of the hexagonal-shaped tunable optics of FIGS. 1-3.

When the tunable optic 100 is configured such that its lens characteristics are that of a cylindrical lens, more than one tunable optic 100 is preferably used to achieve an adjustable beam pattern. In particular, and as shown in FIG. 8, a tightly arrayed tunable optic 800, consisting of seven individual hexagonal-shaped tunable optics, is used. The tightly arrayed tunable optic 800 includes a center hexagonal-shaped tunable optic C surrounded by six other hexagonal-shaped tunable optics S1, S2, S3, S4, S5, S6, and such that there are no gaps between adjacent hexagonal-shaped tunable optics. For convenience of depiction and description, the side walls of each of the hexagonal-shaped tunable optics in FIG. 8 is indicated using a single number, 1 through 6. Moreover, the voltage that is supplied to each side wall is referenced herein using the convention of "$V_{i,j}$", where "i" refers to the specific hexagonal-shaped tunable optic, and "j" refers to the specific side wall of the hexagonal-shaped tunable optic. For example, "$V_{S1,1}$" refers to the voltage supplied to side wall 1 of tunable optic S1, "$V_{S1,2}$" refers to the voltage supplied to side wall 2 of tunable optic S1, and so on.

Before proceeding further, it is generally known that electrowetting tunable optics have what is referred to as a critical voltage ($V_{crit}$). It is also generally known that the critical voltage of an electrowetting tunable optic is the voltage at which the surface 124 of the polar liquid 112 is flat, and thus any light passing through the tunable optic is not focused or diverged.

Returning now to the description, the tightly arrayed tunable optic 800 may also selectively function as either a search light or a landing light. When it is desirable for the tightly arrayed tunable optic 800 to function as a search light, the first and fourth side walls of the center optic C are supplied with the critical voltage, and two parallel side walls of each of the surrounding hexagonal-shaped tunable optics S1, S2, S3, S4, S5, S6 are also supplied with the critical voltage. That is:

$$V_{C,1}=V_{C,4}=V_{crit}, \text{ and}$$

$$V_{S1,1}=V_{S1,4}=V_{S2,2}=V_{S2,5}=V_{S3,3}=V_{S3,6}=V_{S4,1}=V_{S4,4}=V_{S5,2}=V_{S5,5}=V_{S6,3}=V_{S6,6}=V_{crit}.$$

Figure 9:
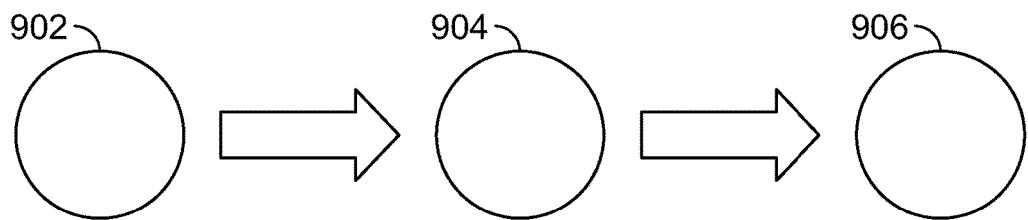
FIGS. 9 and 10 depict, in simplified manner, how the tightly arrayed tunable optic of FIG. 8 may modify an incident light beam.

With this combination voltages applied to the tightly arrayed optic 800, and as FIG. 9 depicts in simplified form, when a light beam 902 from a non-illustrated light source passes through each of the individual tunable optics C, S1, S2, S3, S4, S5, S6, the beam pattern 904 through each individual tunable optic C, S1, S2, S3, S4, S5, S6 is unchanged, and the combined beam pattern 906 from the tightly arrayed optic 800 is also unchanged. It will be appreciated that the combined beam pattern 906 may be steered by varying the voltages supplied to the other side walls of each of the hexagonal-shaped tunable optics C, S1, S2, S3, S4, S5, S6.

When it is desirable for the tightly arrayed tunable optic 800 to function as a landing light, the first and fourth side walls of the center optic C are again supplied with the critical voltage. However, the two parallel side walls of each of the surrounding hexagonal-shaped tunable optics S1, S2, S3, S4, S5, S6 are not supplied with the critical voltage. That is:

$$V_{C,1}=V_{C,4}=V_{crit},$$

$$V_{S1,1}=V_{S1,4}=V_{S2,2}=V_{S2,5}=V_{S3,3}=V_{S3,6}=V_{S4,1}=$$
$$V_{S4,4}=V_{S5,2}=V_{S5,5}=V_{S6,3}=V_{S6,6}\neq V_{crit}.$$

Figure 10:
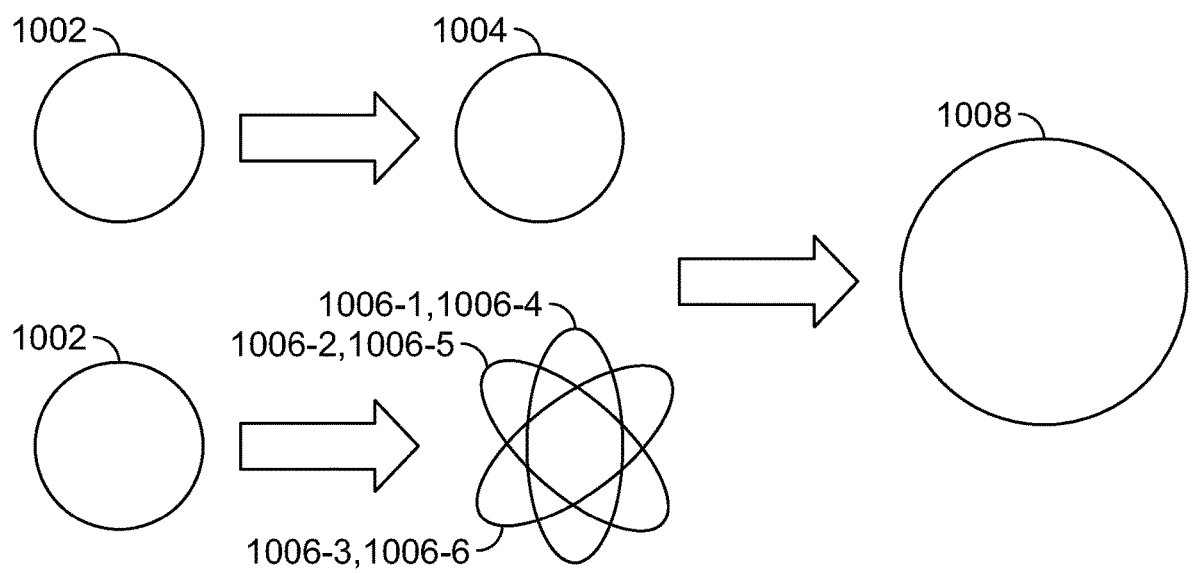

With this combination voltages applied to the tightly arrayed optic 800, and as FIG. 10 depicts in simplified form, when a light beam 1002 from a non-illustrated light source passes through each of the individual tunable optics C, S1, S2, S3, S4, S5, S6, the beam pattern 1004 through the center tunable optic C is unchanged. However, the beam patterns 1006-1, 1006-2, 1006-3, 1006-4, 1006-5, 1006-6 through each of the surrounding tunable optics, S1, S2, S3, S4, S5, S6 become elliptical (due to each tunable optic being a cylindrical lens), and are rotated 60-degrees relative to its immediately adjacent surrounding tunable optic. As such, the combined beam pattern 1008 from the tightly arrayed optic 800 is enlarged as compared to the incident light beam 1002. Again, it will be appreciated that the combined beam pattern 1008 may be steered by varying the voltages supplied to the other side walls of each of the hexagonal-shaped tunable optics C, S1, S2, S3, S4, S5, S6.

Figure 11:
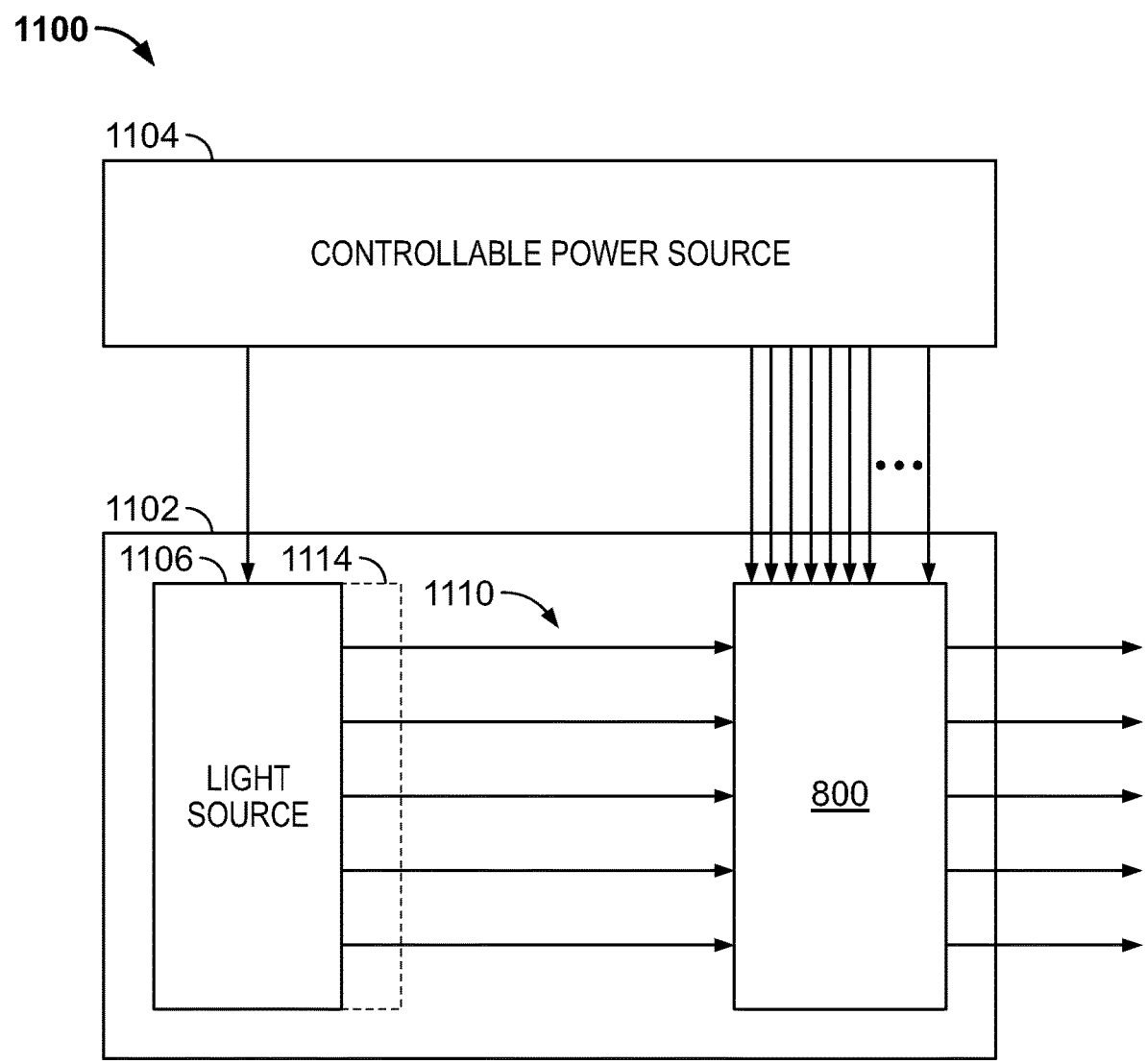
FIG. 11 is a functional block diagram of one example embodiment of a light control system that includes the tightly arrayed tunable optic depicted in FIG. 8.

The tightly arrayed tunable optic 800 described above may also be implemented as part of a light control system. A functional block diagram of one embodiment of a light control system 1100 is depicted in FIG. 11 and includes a housing 1102, a controllable power source 1104, a light source 1106, and the tightly arrayed tunable optic 800. The housing 1102 may be variously adapted and configured, depending upon the end-use of the light control system 1100. For example, the housing 1102 may be adapted and configured to be mounted in or on various types of terrestrial vehicles, various types of aircraft, various types of spacecraft, and various types of seagoing craft (both submersible and non-submersible). The housing 1102 may also be adapted for various other end-use environments, as needed or desired.

The controllable power source 1104 is configured to supply a plurality of voltages to the hexagonal-shaped tunable optics C, S1, S2, S3, S4, S5, S6. In particular, each hexagonal-shaped tunable optic C, S1, S2, S3, S4, S5, S6 is coupled to receive six voltages (some or all of which may be variable). That is, for each hexagonal-shaped tunable optic C, S1, S2, S3, S4, S5, S6, a first voltage is supplied to its first electrode, a second voltage is supplied to its second electrode, a third voltage is supplied to its third electrode, a fourth voltage is supplied to its fourth electrode, a fifth voltage is supplied to its fifth electrode, and a sixth voltage is supplied to its sixth electrode. As FIG. 11 also depicts, the controllable power source 1104 may additionally be configured to supply a voltage to the light source 1106, thereby electrically energizing the light source 1106. The voltage supplied to the light source 1106 may be fixed or it may be variable. In other embodiments, the light source 1106 may be electrically energized from a power source that is separate and distinct from the controllable power source 1104.

Regardless of its electrical energization source, the light source 1106 is coupled to the housing 1102 and is operable, upon being electrically energized, to emit a light beam 1110 (for simplicity, depicted using a plurality of individual rays). The light source 1106 may be variously configured and implemented. For example, it may be implemented using one or more light emitting diodes (LEDs), one or more lasers, one or more gas discharge lamps, or one or more incandescent lamps, just to name a few. In some embodiments, the light source 406 may be configured to emit white light or it may be configured to emit color light. In some embodiments, the light source 1106 may be an individual light source or may be implemented using an array of light sources.

In some embodiments the light control system 1100 may additionally include one or more optic elements 1114, which are depicted in phantom in FIG. 11. The one or more optic elements 1114, when included, are preferably non-variable optics 1114 and are coupled to the housing 1102 and are disposed between the light source 1106 and the tightly arrayed tunable optic 800. The specific type of non-variable optic 1114 that is used may vary and may depend, for example, on the specific light source 1106 used, and may be the previously mentioned reflector, total-internal-reflection (TIR) lens, or optic lens.

Figure 12:
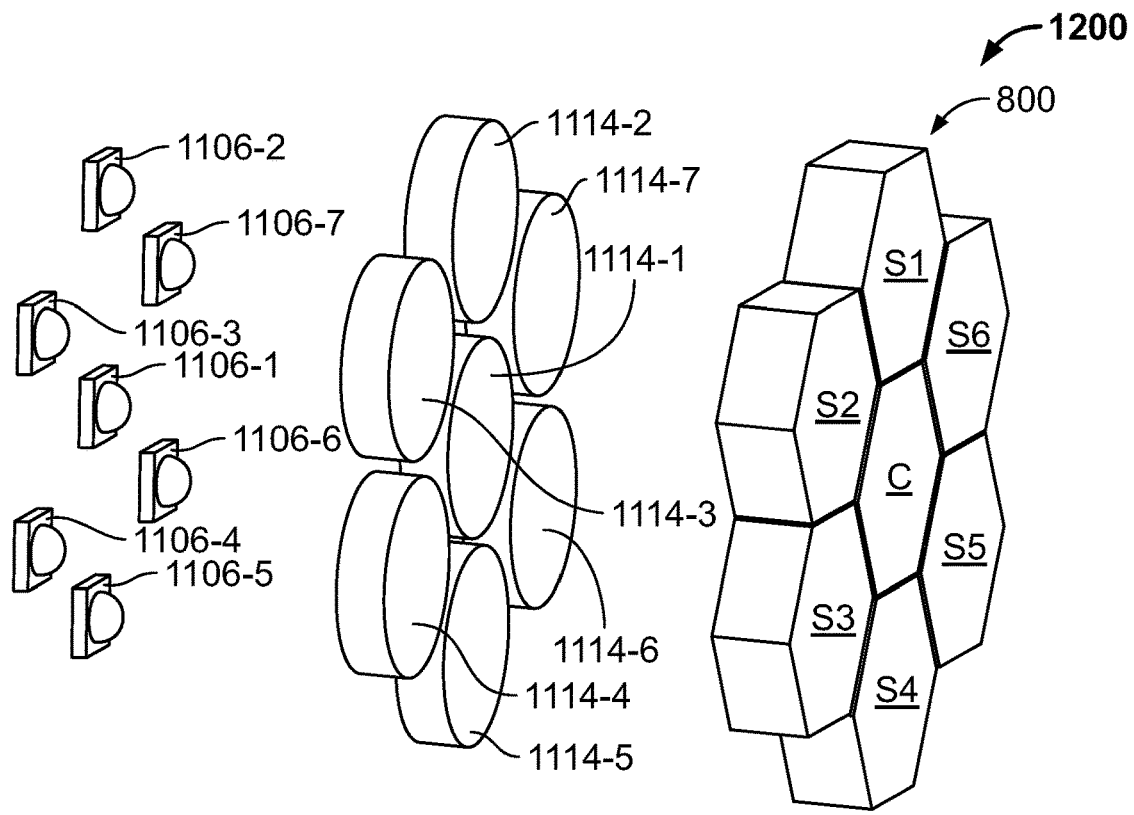
FIGS. 12 and 13 depict a simplified, perspective views of alternative embodiments of the light control system of FIG. 11.
Figure 13:
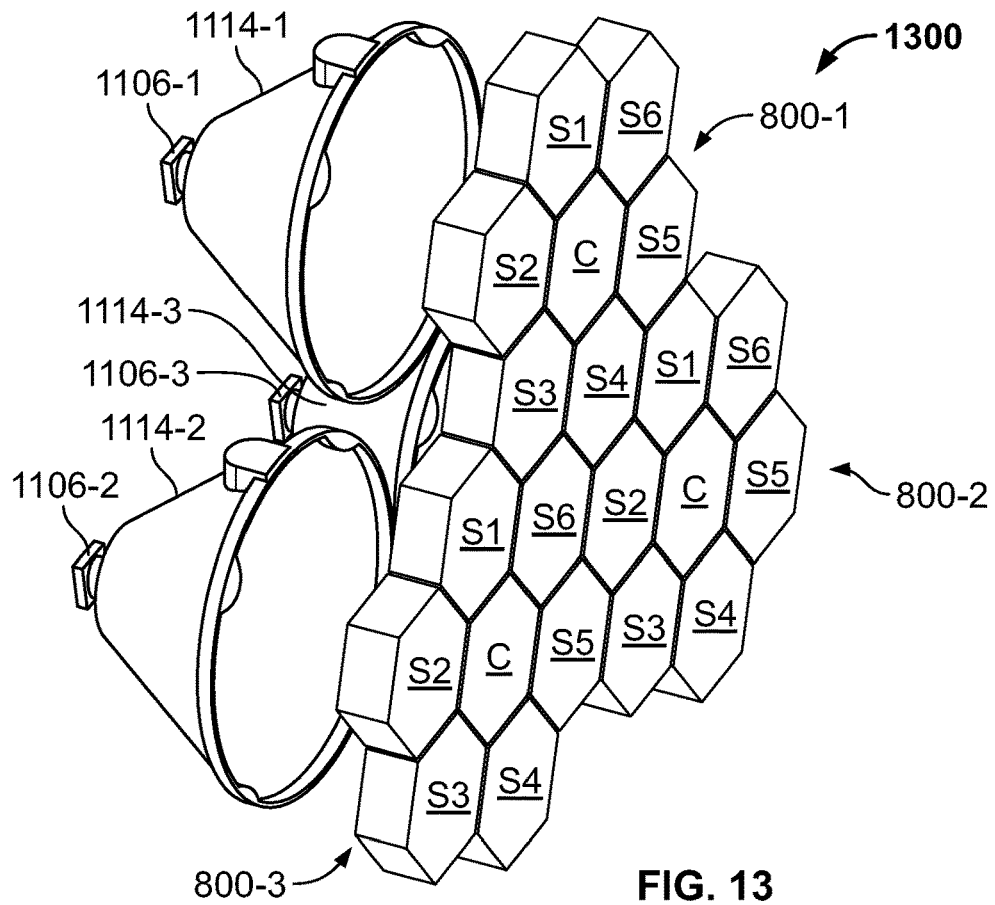

The system 1100 depicted in FIG. 11 may be modified as depicted in FIG. 12, to include a plurality of individual light sources, or as depicted in FIG. 13, to include a plurality of individual light sources and a plurality of tightly arrayed tunable optics. Before describing the systems depicted in FIGS. 12 and 13, it should be noted that like reference numerals used in FIGS. 12 and 13 refer to like elements depicted in FIG. 11 and described above.

With the system 1200 in FIG. 12, the light source 1106 is implemented as an array of individual light sources 1106-1, 1106-2, 1106-3, 1106-4, 1106-5, 1106-6, 1106-7. As with the system 1100 of FIG. 11, each individual light source 1106 is operable, upon being electrically energized, to emit a light beam (not shown in FIG. 12). As FIG. 12 also depicts, each light source 1106 is associated with, and is disposed to emit light toward, a different one of the hexagonal-shaped tunable optic C, S1, S2, S3, S4, S5, S6. As with the system 1100 of FIG. 11, the system 1200 in FIG. 12 may also, in some embodiments, include a plurality of non-variable lenses 1114, such as those described above, where each non-variable lens 1114 is associated with, and is disposed between, a different one of the individual light sources 1106 and a different one of the hexagonal-shaped tunable optic C, S1, S2, S3, S4, S5, S6.

With the system 1300 in FIG. 13, the light source 1106 is also implemented as an array of individual light sources 1106-1, 1106-2, 1106-3. As with the system 1100 of FIG. 11, each individual light source 1106 is operable, upon being electrically energized, to emit a light beam (not shown in FIG. 13). As FIG. 13 also depicts, each light source 1106 is associated with, and is disposed to emit light toward, a different one of the tightly arrayed tunable optics 800-1, 800-1, 800-3. As with the system 1100 of FIG. 11, the system 1300 in FIG. 12 may also, in some embodiments, include a plurality of non-variable lenses 1114, such as those described above, where each non-variable lens 1114 is associated with, and is disposed between, a different one of the individual light sources 1106 and a different one of the tightly arrayed tunable optics 800. Although three light sources 1106-1, 1106-2, 1106-3 and three tightly arrayed tunable optics 800-1, 800-1, 800-3 are depicted in FIG. 13, it will be appreciated that the system 1300 could be implemented with more or less than this number.

The light control system described herein implements non-mechanical, liquid based, variable beam pattern and two-dimensional beam steering, and is relatively smaller, lighter, and less costly than currently known systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A tunable optic, comprising:
a hexagonal-shaped housing including first, second, third, fourth, fifth, and sixth side walls and first and second light transmissive end walls, the first and fourth side walls disposed parallel to each other, the second and fifth sidewalls disposed parallel to each other, the third and sixth sidewalls disposed parallel to each other, the first and second light transmissive end walls spaced apart from each other and coupled to the first, second, third, fourth, fifth and sixth side walls, whereby the first, second, third, fourth, fifth and sixth side walls and the first and second light transmissive end walls define a hexagonal-shaped inner cavity;
a polar liquid disposed within the hexagonal-shaped inner cavity;
a first electrode coupled to the first side wall;
a second electrode coupled to the second side wall;
a third electrode coupled to the third side wall;
a fourth electrode coupled to the fourth side wall;
a fifth electrode coupled to the fifth side wall;
a sixth electrode coupled to the sixth sidewall; and
a grounding electrode electrically connected to the polar liquid,
wherein:
the polar liquid has a surface, and
the surface has a curvature and a two-dimensional tilt angle that is variable in response to voltages supplied to each of the first, second, third, fourth, fifth, and sixth electrodes, whereby lens characteristics and light deflection characteristics of the tunable optic are varied.

2. The tunable optic of claim 1, wherein:
varying the curvature of the surface varies the lens characteristics; and
varying the tilt angle of the surface in two dimensions varies the light deflection characteristics in two dimensions.

3. The tunable optic of claim 1, further comprising:
a controllable power source coupled to, and operable to supply at least, a first voltage to the first electrode, a second voltage to the second electrode, a third voltage to the third electrode, a fourth voltage to the fourth electrode, a fifth voltage to the fifth electrode, and a sixth voltage to the sixth electrode.

4. The tunable optic of claim 1, further comprising:
a dielectric layer is coated on the first, second, third, fourth, fifth, and sixth side walls; and
a hydrophobic layer overlies the dielectric layer, wherein the polar liquid contacts at least a portion of the hydrophobic layer.

5. The tunable optic of claim 4, wherein the dielectric layer, the hydrophobic layer, the polar liquid, and dimensions of the first, second, third, fourth, fifth, and sixth side walls are selected such that the lens characteristics are that of a spherical lens.

6. The tunable optic of claim 4, wherein the dielectric layer, the hydrophobic layer, the polar liquid, and dimensions of the first, second, third, fourth, fifth, and sixth side walls are selected such that the lens characteristics are that of a cylindrical lens.

7. The tunable optic of claim 4, further comprising:
a non-polar liquid disposed within the hexagonal-shaped inner cavity, the non-polar liquid contacting the polar liquid and the hydrophobic layer.

8. The tunable optic of claim 7, wherein:
the polar liquid is a saline solution; and
the non-polar liquid is an oil.

9. A light control system, comprising:
a housing;
a controllable power source configured to supply a plurality of separate and individual voltages;
a light source coupled to the housing and operable, upon being electrically energized, to emit a light beam; and
at least seven hexagonal-shaped tunable optics coupled to the housing and arranged such that one of the hexagonal-shaped tunable optics is surrounded by six other hexagonal-shaped tunable optics and such that there are no gaps between adjacent hexagonal-shaped tunable optics, each hexagonal-shaped tunable optic disposed to receive at least a portion of the light beam emitted from the light source, each hexagonal-shaped tunable optic having tunable lens characteristics and tunable light deflection characteristics, each hexagonal-shaped tunable optic further coupled to receive six separate and individual voltages from the controllable power source, each hexagonal-shaped tunable optic comprising a liquid that varies the tunable lens characteristics and tunable light deflection characteristics in response to the six voltages supplied thereto, whereby light beam pattern and light beam steering are achieved.

10. The light control system of claim 1, further comprising a non-variable lens coupled to the housing and disposed between the light source and each hexagonal-shaped tunable optic.

11. The light control system of claim 10, wherein the non-variable lens is configured as a total-internal-reflection (TIR) lens.

12. The light control system of claim 9, wherein the light source comprises one or more light emitting diodes (LEDs).

13. The light control system of claim 9, wherein the light source comprises one or more lasers.

14. The light control system of claim 9, wherein:
the light source is an array of individual light sources, each individual light source coupled to the housing and operable, upon being electrically energized, to emit an individual light beam;
each hexagonal-shaped tunable optic is associated with a different one of the individual light sources and is disposed to receive the individual light beam emitted from its associated individual light source.

15. The light control system of claim 9, further comprising a plurality of non-variable lenses, each non-variable lens coupled to the housing and disposed between a different one of the individual light sources and a different one of the hexagonal-shaped tunable optics.

16. The light control system of claim 15, wherein each non-variable lens is configured as a total-internal-reflection (TIR) lens.

17. The light control system of claim 9, wherein:
the six voltages include a first voltage, a second voltage, a third voltage, a fourth voltage, a fifth voltage, and a sixth voltage; and
each hexagonal-shaped tunable optic comprises:
first, second, third, fourth, fifth, and sixth side walls and first and second light transmissive end walls, the first and fourth side walls disposed parallel to each other, the second and fifth sidewalls disposed parallel to each other, the third and sixth sidewalls disposed parallel to each other, the first and second light transmissive end walls spaced apart from each other and coupled to the first, second, third, fourth, fifth and sixth side walls, whereby the first, second, third, fourth, fifth and sixth side walls and the first and second light transmissive end walls define a hexagonal-shaped inner cavity;
a polar liquid disposed within the hexagonal-shaped inner cavity;
a first electrode coupled to the first side wall and coupled to receive the first voltage;
a second electrode coupled to the second side wall and coupled to receive the second voltage;
a third electrode coupled to the third side wall and coupled to receive the third voltage;
a fourth electrode coupled to the fourth side wall and coupled to receive the fourth voltage;
a fifth electrode coupled to the fifth side wall and coupled to receive the fifth voltage;
a sixth electrode coupled to the sixth sidewall and coupled to receive the sixth voltage; and
a grounding electrode electrically connected to the polar liquid.

18. The light control system of claim 9, wherein:
varying the curvature of the surface varies the lens characteristics; and
varying the tilt angle of the surface in two dimensions varies the light deflection characteristics in two dimensions.

19. The light control system of claim 9, further comprising:
a dielectric layer is coated on the first, second, third, fourth, fifth, and sixth side walls; and
a hydrophobic layer overlies the dielectric layer; and
a non-polar liquid disposed within the hexagonal
wherein the polar liquid contacts at least a portion of the hydrophobic layer.

20. The tunable optic of claim 19, wherein:
the polar liquid is a saline solution; and
the non-polar liquid is an oil.

* * * * *